March 26, 1940.  B. A. PROCTOR  2,194,481
FILM HANDLING AND APPARATUS THEREFOR
Original Filed Jan. 6, 1934   3 Sheets-Sheet 2
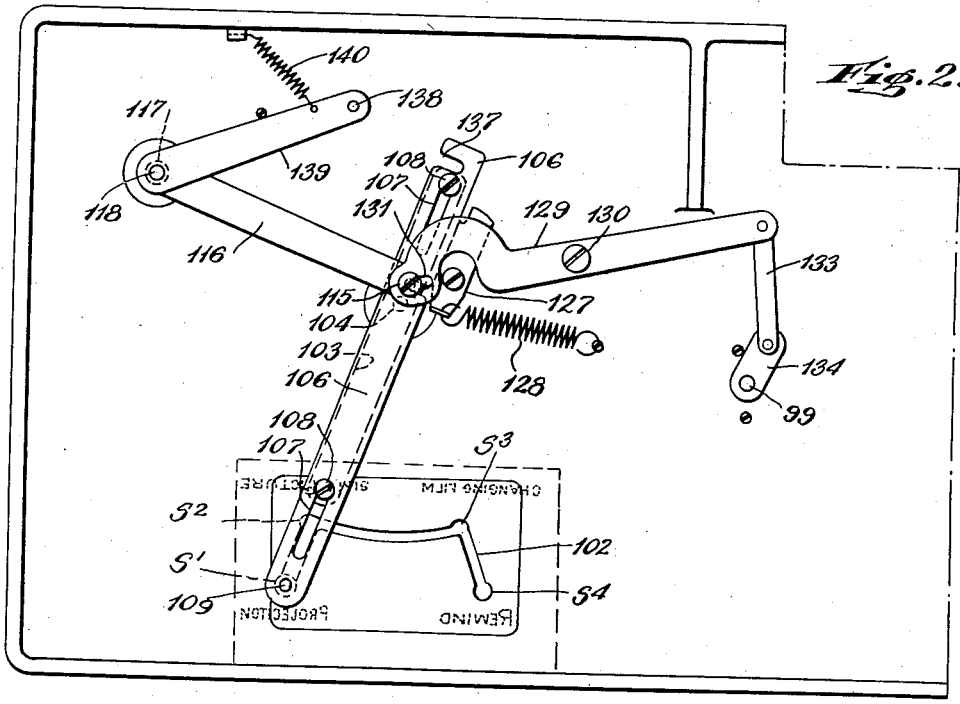
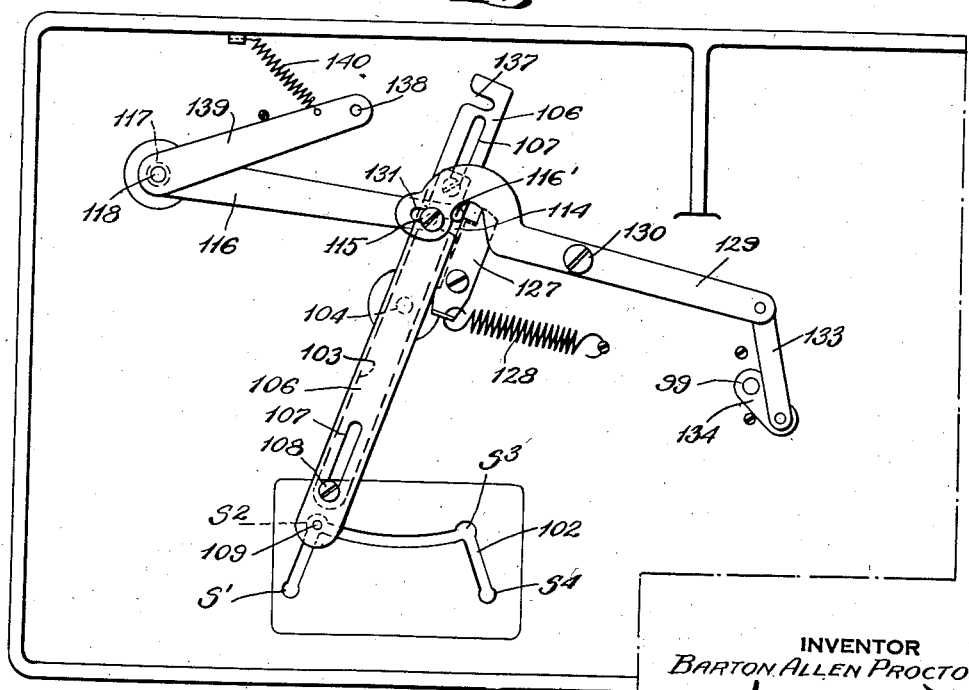
INVENTOR
BARTON ALLEN PROCTOR,
BY
ATTORNEY March 26, 1940.  B. A. PROCTOR  2,194,481
FILM HANDLING AND APPARATUS THEREFOR
Original Filed Jan. 6, 1934   3 Sheets-Sheet 3
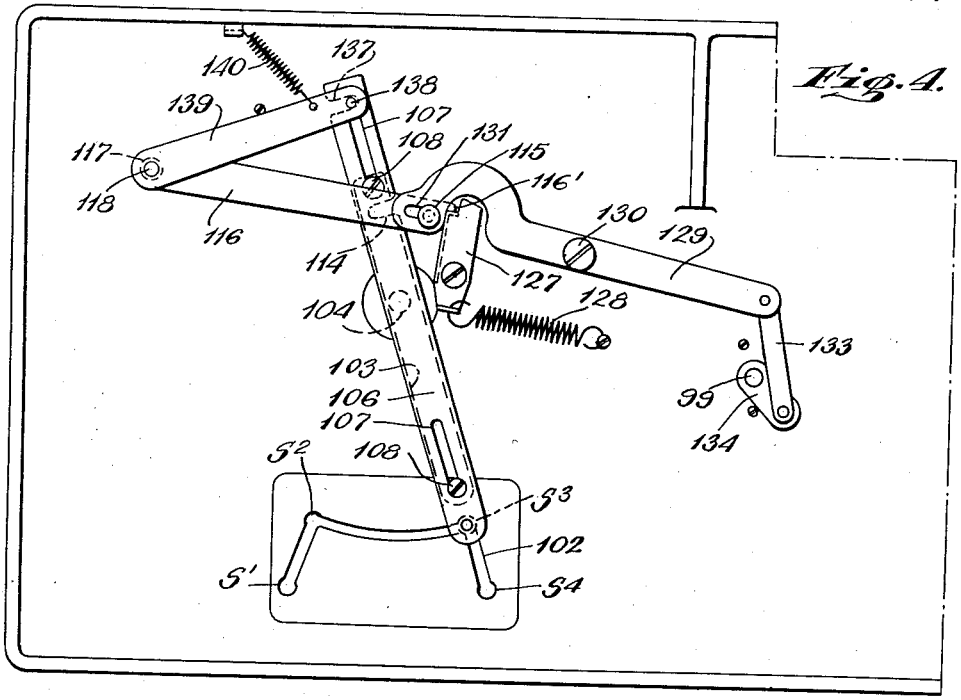
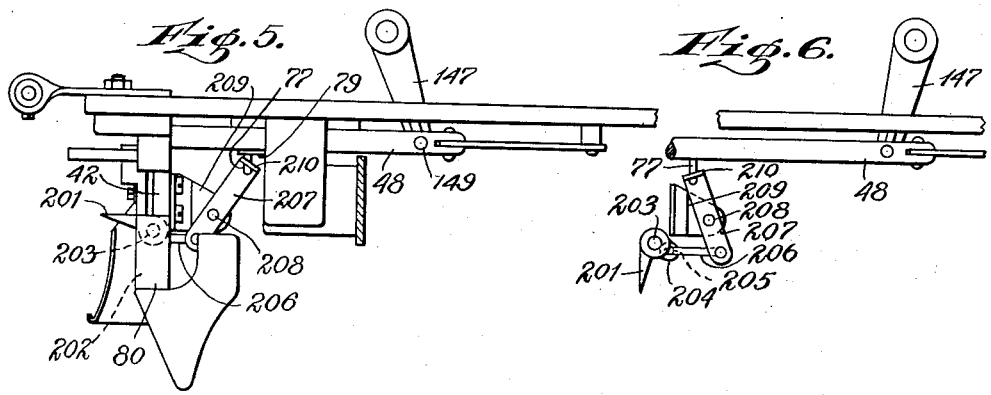
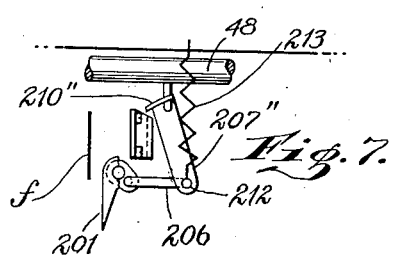
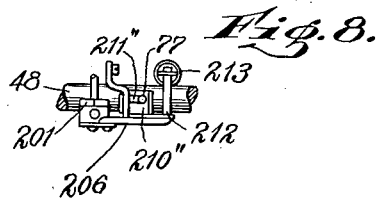
INVENTOR
BARTON ALLEN PROCTOR.
BY
ATTORNEY

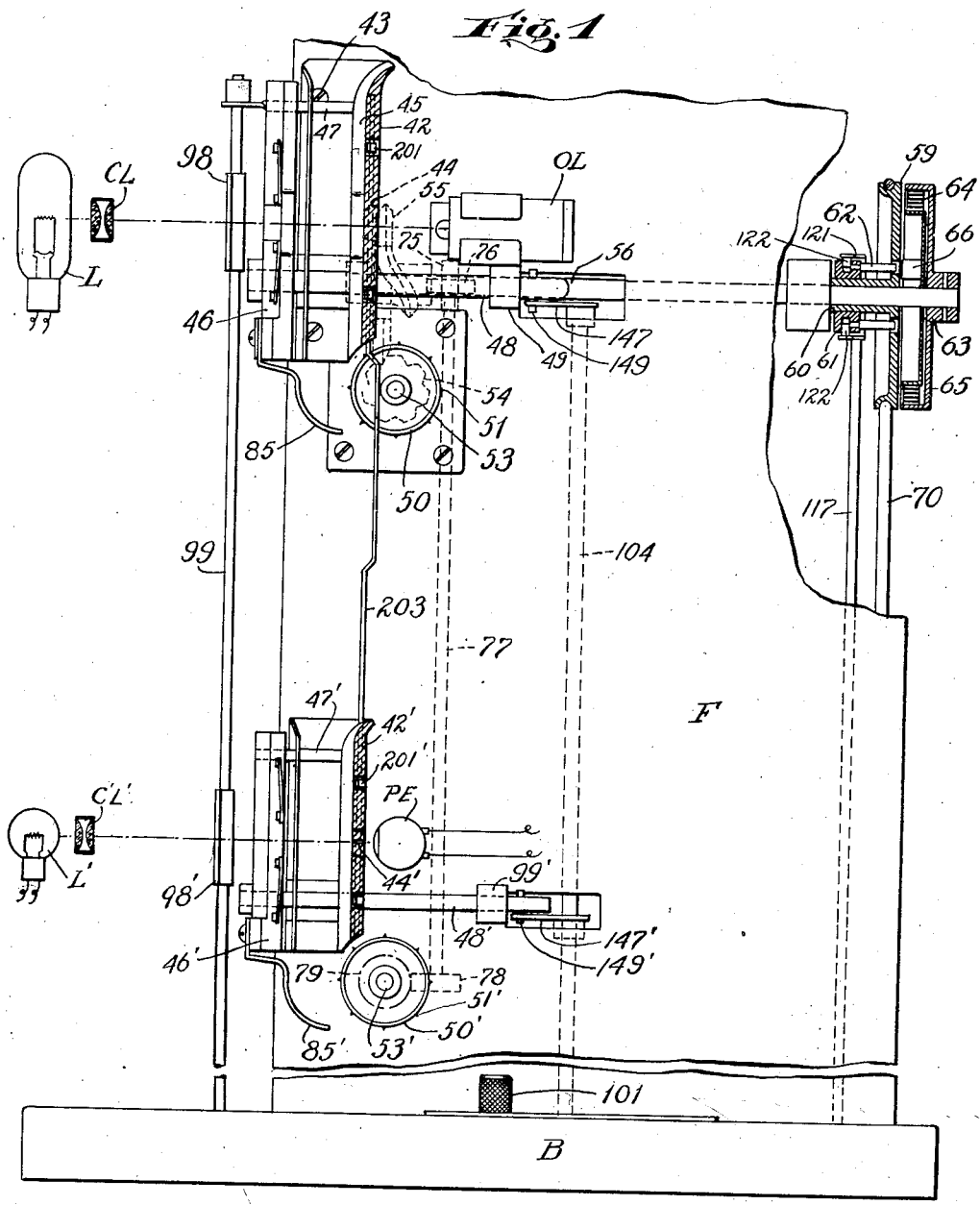

UNITED STATES PATENT OFFICE 2,194,481

FILM HANDLING AND APPARATUS THEREFOR

Barton Allen Proctor, Larchmont, N. Y., assignor to Kinatome Patents Corporation, a corporation of New York Application January 6, 1934, Serial No. 705,547
Renewed July 21, 1939

24 Claims. (Cl. 88—16.2)

The present invention relates particularly to apparatus for the handling and feeding of film, and more broadly to apparatus adapted for the positioning and handling and feeding of motion picture film bearing pictorial and sound images thereon whereby the film is automatically placed in complete operative relation to the feeding and guiding mechanism of the apparatus including that of a usual sound head and different characteristic film threading movements are obtained at will.

The present application is a continuation in part of my co-pending application, which is hereinafter designated as "my parent application", which upon January 16, 1934, matured as United States Patent No. 1,944,037. Said co-pending application is a continuation in part of my co-pending application which upon January 16, 1934, matured as United States Patent No. 1,944,033 and also a continuation in part of my co-pending application which upon January 24, 1933, matured as United States Patent No. 1,894,963.

Film handling apparatus as heretofore provided has required the accurate manual positioning of the film with reference to the feeding and guiding mechanism as a prerequisite to the operation of such feeding mechanism. In my parent application, means were disclosed and broadly claimed for positioning a film in proper relation to the feeding means of the apparatus. I stated in my first above mentioned co-pending application "Although I am showing my invention as applied to motion picture projecting apparatus, it will be understood that it can be applied broadly to any art to which material is fed, and that it is particularly useful in connection with the handling of film, whether light sensitive for use for the camera or sound recording apparatus, or image bearing, for use in a motion picture or other projecture, or with a sound reproducing instrument, or with an apparatus adapted for the simultaneous reproduction of visual images of things and sounds."

In the present application there is disclosed means arranged for the positioning of film bearing both pictorial and sound images thereon in operative relation to the guiding and feeding means for advancing the film for projecting pictures therefrom and also in operative relation to the feeding means for advancing the film past usual means for projecting sound images, i. e., a sound head for reproducing sound from the film in a well known way.

An object of the present invention is to provide a film handling mechanism effective for producing in predetermined sequences certain film threading and removing operations previous and subsequent to the operation of the normal film feeding mechanism, such feeding mechanism including means for feeding the film for projecting pictures therefrom and means for reproducing sound from film.

Another object of the invention is the provision of mechanism capable of performing automatically the various film handling operations in connection with the placing of a film bearing both pictorial and sound images in operative relation to feeding means for projecting pictures and to feeding means for reproducing sound, in the sequence which is desired or necessary for the particular purpose in mind. A further object of the invention is the provision of unitary control means for a film handling apparatus for operating the apparatus as described above. A further object is the provision of mechanism adapted to safeguard the film while it is being moved into operative relation with the feeding means.

Other advantages and characteristics of the present invention will appear as the description proceeds and from the attached drawings and the subjoined claims. Although I am showing only one embodiment of my invention as a whole it will be readily understood that I am not limited to this particular construction as changes may be readily made without departing from the spirit of my invention or the scope of my broader claims.

In the drawings:

Figure 1 is a right partial side elevation broken away to show actuating parts relating to both feeding and guiding means in film threading position, and illustrating the shutter or main feeding clutch.

Figure 2 is a partial bottom plan view showing the actuating levers of the control mechanism in normal projection position.

Figure 3 is a partial bottom plan view showing the actuating levers in still projection position.

Figure 4 is a partial bottom plan view showing actuating levers in film threading or changing position.

Figure 5 is an enlarged detail view showing the latent positioning element in the film locking position as when the film is being fed.

Figure 6 is a partial enlarged detail view showing the positioning element in film threading or open position.

Figure 7 shows structure similar and alternative to that of Figure 6.

Figure 8 is an enlarged detail side view of the positioning mechanism shown in Figure 7, the film positioning fingers being shown in open or film threading position.

It will be readily understood as the description proceeds that the present invention may be practised on widely varying types of film handling apparatus. The drawings forming a part of the present application show, for illustrative purposes only, portions of the apparatus disclosed in my parent application together with views, largely diagrammatical, of a conventional sound reproducing apparatus such as is mentioned in my parent application.

A base B carries a mounting frame F on which is fastened a substantially right-angled gate section 42 preferably secured in any desired manner as by screws 43 against movement relatively to the frame. This gate section is preferably formed with aperture 44, through which light, from a lamp L may be passed as is well understood in the art. A film guiding depression 45 extends lengthwise of the section 42 and intersects an aperture 44 for cooperation with the film, such film guiding depression being shown as relatively deep. Cooperating with section 42 is a relatively movable section 46 preferably guided by a pin 47 projecting outwardly from the section 42 and secured to one end of a gate opening rod 48 slidable through a suitable opening in the gate section 42 and a suitable bearing 49 on the frame F. By reason of this construction it will be apparent that when the rod 48 is moved to the left as viewed in Figure 1, it will be effective for moving section 46 away from the section 42 thus opening the gate to permit the removal of a film and the insertion of a new film, while movement in the opposite direction will bring the gate sections into cooperative relation.

For effecting the desired intermittent feeding movement of a film in position in the gate, there may be provided a feeding sprocket 50 having teeth 51 adapted to engage apertures or perforations in the film. This sprocket is mounted on a shaft 53 which may extend transversely through the frame F and carry at its opposite end a star wheel 54. This star wheel is intermittently driven by means of a sectional or off-set cam 55 secured adjacent one end of a shutter shaft 56. The means for operating the sprocket 50 may be constructed as disclosed in my parent application.

Mounted loosely upon shaft 56 adjacent the opposite end thereof from said cam, is a pulley 59 provided with a long bearing 60 upon which is mounted a driving collar 61 from which project forwardly clutch pins 62 through appropriate openings in the pulley 59. Pinned to the shaft 56 there is provided the driving collar 63 to which is attached one end of the spring 64, the other end of the spring being attached to the clutch element 65, to which there is also attached the driving block 66. The construction of the driving block 66 may be the same as disclosed in my parent application.

A suitable shutter for operation with the film at the aperture may be constructed as disclosed in my parent application, or in any other suitable and satisfactory way. Means for driving the shaft 56 may include a belt 70 engaging the pulley 59 and another pulley, not shown, which may be constructed and be driven by an electric motor, for example, according to the disclosure of my parent application. By reason of this construction, it will be apparent that when the collar 61 and the pin 62 are moved to the right the inertia or yielding of the spring 64 will be absorbed and after a period of dwell rotation will be imparted to the shutter shaft 56 and such rotation will be effective for operating the shutter and for obtaining the desired intermittent operation of the film feeding sprocket 50.

The usual film delivery and film take-up members may be employed.

A film presser member 85 may be mounted on the movable gate section 46 and have a contour as shown in Figure 1 suitable for pressing the film into operative engagement with the sprocket 50. It will be understood that the presser member 85 will be arranged with suitable groove elements and a relieved portion for cooperation with the teeth 51 of the sprocket 50 and the film on the sprocket to prevent the film being injured by the presser member.

The source of light L and condensing lens CL are arranged in a well-known way for cooperation with the aperture and objective lens OL. A heat shield 98 for protecting the film at the aperture from the heat of the lamp L while the film is stationary may be mounted on a downwardly extending vertical rock shaft 99, the lower end portion of which extends through an opening in the top of said base B to be operatively connected with control mechanism hereinafter described.

For moving the gate section 46 up into close film feeding relation with the gate section 42 the rod 48 may be connected with the above noted control mechanism by means which include a pin 149 in the forward end of the rod 48 and a slotted bell crank 147 which engages the pin 149 and is fastened to a vertical rock shaft 104 which extends downwardly through an opening in the top of the base B to a connection with the above noted control mechanism.

Structure illustrating that portion of my invention which relates to positioning the film with relation to feeding means for moving the film continuously past a sound head for translating the sound symbols on the film into sound is shown more or less diagrammatically in Figure 1. For convenience in illustrating this feature of my invention I choose to show a gate structure similar to that shown for cooperation with the means for feeding a film intermittently. This gate structure which may be arranged for cooperation with a photo-electric cell PE may include a fixed gate section 42' and a movable gate section 46'. The fixed gate section may be mounted on the frame F similarly to the mounting of the gate section 42, and a movable gate section 46' may be guided by a pin 47' similar to pin 47 and be secured to one end of a gate opening rod 48' slidable through a suitable opening in the gate section 42' and suitable bearing 49' on the frame F. By reason of this construction, it will be apparent that when the rod 48' is moved to the left (as viewed in Figure 1) by means to be presently described it will be effective for moving the section 46' away from section 42' to permit the removal of a film and the insertion of a new film, while movement in the opposite direction for bringing the gate section into cooperative relation in the same manner described above with regard to the gate sections 42 and 46. A suitable source of light, i. e., an exciter lamp, L' and a lens C'L' may be mounted in any suitable way for cooperation with a usual sound opening 44' provided in the fixed gate section 42' opposite the photo-electric cell PE. It will be understood by those skilled in the art that a connection between the photo-electric cell PE and suitable sound reproducing and amplifying means is required for reproducing sound from the film.

For moving the film continuously past the photo-electric cell PE a sprocket 50' having teeth 51' of a usual kind may be mounted on a shaft 53'. It will be understood by those skilled in the art that the number of revolutions per minute of the sprocket 50' must be the same as that for the sprocket 50. Therefore the sprocket 50' may be driven in any suitable way at the same speed as sprocket 50. For illustrative purposes, I show means for driving the sprocket 50' which includes a spiral gear 75 on the shaft 56 between the cam 44 and the clutch part 62. This gear 75 co-acts with another gear 76 mounted on a vertical shaft 77 which extends downwardly to a point opposite the shaft 53'. A spiral gear 78 on the lower end of the shaft 77 is arranged to engage a spiral gear 79 on the shaft 53' for driving the sprocket 50' at a rate that will make its number of revolutions per minute equal to that of the sprocket 50.

When a film handling apparatus having only one gate is in a film threading position, with the gate open a path is provided for the film adjacent the usual intermittent feeding means into which path the film can be placed with one bodily movement thereof after being initially positioned in the region adjacent the film path through the gates. In some cases, the operator with this one movement places the film completely in such film track, but if he is careless, hasty or unskilled he may not move it completely within the position of the track as defined by a single gate. In a film handling apparatus for use with sound on film and employing the two conventional gates spaced apart a usual distance, it is obviously more difficult quickly and accurately to position the film in both gates, by manual operations. Moreover, such positioning means may be particularly useful in apparatus in which the preliminary threading operation is automatic. Therefore I have provided lateral positioning mechanism which automatically brings the film completely into the film track of both gates and into the proper operating plane defined by the gates, thus automatically carrying out one of the important parts of the threading operation after the user has placed the film within the general area of the gate.

As will be apparent from Figures 1, 5, and 6 there are provided film positioning or threading fingers 201 of such nature that when retracted they lie entirely within recesses 202 provided within the area of the gate section 42. Similar fingers 201' are provided with the gate section 42' for operation by means presently to be described. Suitably attached to the fingers 201 is a connecting rod 203 which extends downwardly to have attached thereon the fingers 201'. For operatively moving rod 203, an arm 204 may be fastened on the rod and have an opening 205 by which it is connected to a link 206 which in turn is attached to the lever 207 having a pivotal mounting 208 carried by the bracket 209 projecting from the gate section 42. The end of the lever 207 opposite to that to which the link 206 is attached may be turned substantially at right angles to the body portion to bring an angular portion 210 provided with an opening 211 for the reception of the pin 77 previously described as carried by the rod 48.

By reason of this construction, it will be apparent when the rod 48 is moved to the left as viewed in the drawings, it will be effective for rotating the lever 207' in a counter-clockwise direction and thereby causing a similar rotational movement of the fingers from the locking position shown in Figure 5 into the inoperative or film threading position shown in Figure 6. As such fingers 201 move into a position substantially normal to the longitudinal axis of the rod 203, and within the limits of the gate section 42, the gate section 46 is moved relatively to the section 42, thus opening the gate and permitting the removal of a used film and the insertion of another film.

It will be noted from inspection of Figure 1 that the gate section 46' is connected to the rock shaft 104 by similar means as described above for the gate 46. Such means may include a rod 48', a pin 149 and a bell crank 147', all exactly the same in operation as the similar parts above described.

It can be seen from inspection of the structure of Figure 1 that the fingers 201' used with the gate sections adjacent the photo-electric cell P. E. function in the same way as described above for the fingers 201 since the rod 203 on which the fingers 201 are mounted extends downwardly in position to carry and operate the fingers 201.

The movement of the rod 48 to the right, however, will perform the opposite function. The fingers 201 and 201' will be rotated clockwise simultaneously with the closing of the gate sections 46 and 46' and the movement of the shoes or pressers members 85 and 85' whereby they will tend to sweep completely into the gates and into the film path generally film which may have been within the general areas of the gates and keep such film locked in position until the rods 48 and 48' are again operated.

In many cases, however, it is desirable to force the film completely into its path well in advance of the complete closing of the gates. In Figures 7 and 8 there is illustrated a modified embodiment of that feature of my invention by which such operation may be accomplished. In these figures only structure associated with the upper gate sections 42 and 46 is shown. It will be understood that similar structures to that shown in Figures 7 and 8 may be employed with the gate sections used in cooperation with the continuous feeding sprocket 50'. In the modification shown by Figures 7 and 8 the right-angled portion 210'' of the lever 207'' is substantially arcuate and adapted to receive a relatively long slot 211'' in which the pin 77 moves. The opposite end of such lever 207'' is connected to the link 206 in any desired manner, the link 206 being preferably continued beyond the plane of such lever 207'' to provide mounting for a post 212 for cooperation with the tension spring 213 so positioned as to snap the lever 207'' in one direction or the other after it has been moved a predetermined distance in such direction, the elongated slot 211'' constituting a lost motion connection between the parts. The spring 213 thus becomes effective for quickly and rapidly completing the travel of the fingers 201 to their completely closed position before the rod 48 has moved sufficiently to close completely the gate. It will be seen that in an apparatus making use of this construction there are provided positive means for completely and laterally positioning the film before it is possible for the gate sections to reach their closed positions.

It will be understood that such provision of laterally positioning and locking the parts, effective before the gate is completely closed, is also of great usefulness in apparatus of the type in which initial positioning of the film is along its normal path of travel through a single gate of the apparatus. It can be further seen by those skilled in the art that with any motion picture apparatus wherein there are used two gate devices separated a considerable distance along the film path, one of these gate sections being disposed adjacent the intermittent film feeding means and the other of these gate devices being disposed adjacent the continuous sound feeding means, such positioning fingers are especially helpful in quickly and properly positioning the film in relation to both gate devices at the same time. This advantage will be especially appreciated when it is considered that it usually requires the use of both hands of a skilled operator manually to position the film in one gate.

I preferably provide a control mechanism for operation of the rod 48 and the positioning and locking fingers 201 and 201' in timed or sequential relation to the clutching or declutching of the intermittently moving means, and to the movement of the shield 98 into and out of operative relationship with the lamp, as well as to the opening and closing of the gate and the actuation of the shoe as set forth above. For controlling the operation of the apparatus in the manner desired, there is preferably provided a single control member in the form of a knob or button 101 projecting through a substantially U-shaped slot 102 in the supporting base B. This slot is so shaped as to provide four operating stations, designated, respectively, S1, S2, S3 and S4. The button 101 is adapted to be moved at will so as to occupy any one of these stations. With the button at the station S1, respective members of the apparatus are in such position as to insure normal feeding of the film for projection of pictures in a usual motion picture manner and the reproduction of sound from sound images carried by the film.

With the control button at station S2, there may be obtained a so-called still or stereopticon projection according to the disclosure of my parent application. With the button in position at station S3 the respective members of the apparatus are in such a position as to open the gates and permit positioning of a film within the gates or the removal of a film therefrom which has just been fed through the apparatus.

The control mechanism actuated by the control of 101 is, to a large extent, shown in Figures 2, 3 and 4 which illustrates in succession the changes in the position of the members of the control mechanism by movement of the control button successively to the respective stations. It will be understood that in the present application the control mechanism of my parent application is illustrated and described with special regard to its functions for positioning a film with respect to the separate feeding means of the apparatus and to the gate devices associated with each of the feeding means. The control mechanism for such purposes may comprise a lever 103 keyed or otherwise secured to one end of the brake release or control rod 104 journaled in any desired manner in the base B and extending upwardly to be connected to the gate operating rods 48 and 48' as described hereinbefore. Being secured to the brake release or control rod 104 which is capable only of a turning movement about its longitudinal axis the lever 103 is restricted in its movement to rotation only. Carried by the rotating lever 103 is a combined sliding and rotating lever 106 having adjacent each end a slot 107 through each of which slots projects a headed pin 108 by means of which the combined sliding and rotating lever is effectually mounted on the rotating lever 106 for rotational movement simultaneously therewith and a sliding movement independently thereof. At one end, the lever 106 carries a pin 109 which may be constructed as disclosed in my parent application for movement in the slot 102 with a means for detaining it in any of the operating stations, S1, S2, S3, or S4 to prevent accidental movement from any of these stations in which it may be positioned.

At a point intermediate its length, the combined rotating and sliding lever 106 is provided with a transversely extending recess or open slot 114 adapted to cooperate with a pin 115 projecting from a lever 116 which is mounted on a shaft member described in my parent application for angular control movement. A lever 129 is pivoted about a screw 130 in the top of the base B and one end of the lever 130 extends to a position for engaging with the pin 115, a slot 131 being provided in the lever 130 for engagement with the screw 115. To the opposite end of the lever 129 is fastened one end of a link 133. The other end of the link is pivotally fastened to the bell crank 134 which is rigidly secured to the lower end of the shaft 99 which extends upwardly through the base B and carries the shields 98 and 98' mentioned hereinbefore.

It can be seen from inspection of Figures 1 and 4 that when the control knob 101 is moved to station S3 from station S2 the shields 98 and 98' will first be moved to positions to intercept the light from the lamps L and L', and the rock shaft 35 104 will thereafter be angularly moved so as to move through the above noted connections the gate sections 46 and 46' to open position as shown in Figure 1. At the same time at which the shields are operated, the taking up means will be disconnected from the source of power through connections with the shaft 117 which connections may be constructed as shown in my parent application. It can be further seen that when the knob 101 is moved from station S3 along the groove 102 to station S1 to start projecting operations the positioning fingers 201 and 201' will be moved from the Figure 6 position to the Figure 5 position whereupon they will function to move the film laterally into proper position between the gate sections and concomitantly close the gate sections 46 and 46' and thereafter move the heat shields 98 and 98' to open position thereby disposing the apparatus in position to begin operation. It will be noted that the presser members 85 and 85' move simultaneously with the gate sections 46 and 46' for pressing film against the sprockets 50 and 50' a desired period of time after the film has been moved laterally into proper relation with the sprockets by the structure of Figure 5.

Movement of the control button 101 from station S1 to station S2 is effective first to move the shields 98 and 98' to their effective positions by the means described above, and then the arm 116 and the shaft 117 are moved counter clockwise. If rewinding facilities are provided, as in my parent application, I may substitute a tube for the shaft 117 and place a shaft 118 adapted to control the rewinding operation within said tube. In fact, the control mechanism herein may follow that of my parent applications in all respects. The shaft 117 (see Figure 1) is connected by arms 121 and pins 122 of a yoke device to the clutch collar 61, and counter clockwise movement of the shaft 117 is effective to disconnect the shaft 56 from the source of power operating through the pulley 59. The apparatus is thus disposed for showing a still picture since the taking up means are rendered inoperative by the same angular movement of the tube 117 that disconnects the shaft 56 from the source of power, as is disclosed in my parent application.

It will be noted that while a still picture is shown the shield 98' renders the lamp L' ineffective upon the cell P. E. and no sound is reproduced from the film.

When the control button 101 is disposed in station S4, an arm 139, fastened to a shaft 118 for rewinding purposes as explained in my parent application, is moved against the action of a return spring 140 by engagement of an open slot 137 in the lever 106 with a pin 138 in the arm 139. During the movement of the lever 106 from station S3 to station S4, the lever 118 is engaged by a trigger 127 operated by a spring 128 and held stationary.

Certain of the advantages of my invention appear from the above statements of the specification. Other advantages arise from the organization of film positioning means for operation simultaneously for moving a film initially into operative position in two gate devices spaced apart as usual for feeding a film bearing both pictorial and sound images and in relation to the two feeding members provided therefor.

I claim:

1. In a film handling apparatus, a source of light for projecting pictorial images, means defining a path of travel past said light source for a film bearing thereupon pictorial images and images representing sound, a sound head positioned adjacent said path for reproducing sound from said sound images, said sound head including a light sensitive element for receiving film modulated light, a source for passing light through said sound images and upon said light sensitive element, a positioning member, a mounting for said positioning member, disposed upon said apparatus adjacent said path of travel, upon which said positioning member is rotatable from a first position in which it is disposed substantially in the plane of such path whereby such path is left unobstructed by said positioning member in right angled relation with an edge of such path whereby the film is locked therein against movement lateral thereto, and means for rotating said positioning member.

2. In a film handling apparatus, a source of light, light responsive sound reproducing means, including a light sensitive element for receiving film modulated light, a toothed member for continuously feeding a film bearing thereupon images representing sound and pictorial images past said light-responsive means, means for passing light through said sound images and upon said light-responsive means, and means adjacent one edge of the field of operation of said feeding member for preventing the movement of the film in a direction lateral thereto, said last previously mentioned means including a locking member, a mounting for said locking member adjacent the other edge of the field of operation of said feeding member upon which said locking member is movable between a first position, wherein it is disposed substantially parallel to the axis of said member and lateral access thereto is permitted, and a second position, wherein it is disposed at substantially right angles to such axis and a film is thereby locked by the contact of said locking member against the edge of the film against lateral movement relative to said feeding member, and means for moving said locking member between said positions.

3. In a sound film handling apparatus, a source of light, a light sensitive element for receiving film modulated light, a relatively fixed film engaging member, two movable film engaging members, means for mounting said relatively fixed film engaging member and a first of said movable film engaging members so that said relatively fixed film engaging member and said first movable film engaging member are disposable in spaced and parallel relation to each other so that a film may be inserted therebetween, means for mounting the second of said movable film engaging members so that it is movable into right angled and adjacent relation with both of said other mentioned film engaging members, extending across the space intervening therebetween, means for moving said second movable film engaging member into said last previously mentioned relation, and means for moving said first movable film engaging member into cooperative and adjacent relation with said fixed film engaging member.

4. In a sound film handling apparatus, a source of light, an openable sound head which when closed is rectangular in cross section, said sound head having a slit, means for feeding a film through said sound head, said sound head comprising a light sensitive element for receiving the film modulated light, two fixed members in engagement one with the other, one of which is positioned substantially at right angles to the optical axis of the slit of said sound head and the other of which is positioned substantially parallel to such axis, said two fixed members thereby forming two adjacent sides of such rectangle, two members movable relatively to each other and to said fixed members, and a mounting for each of said movable members, said mounting for the first of said movable members having means by which said member may be moved from a relatively distant position into adjacent cooperative and parallel relation with said fixed member which is positioned substantially at right angles to such axis, thereby forming a third side of such rectangle, and said mounting for the second of said movable members having means by which said second member may be moved from a relatively distant position wherein it leaves the space between said first movable member and said first mentioned fixed member open for the insertion of a film into cooperative relation with said other mentioned movable member and said fixed member and into a position substantially parallel to that of said second mentioned fixed member thereby closing said space and making the fourth side of and completing such rectangle and completing the closing of said sound head.

5. In a film handling apparatus, a source of light, a plurality of film engaging means having a path of travel therebetween for a film bearing thereupon images representing sound, a sound head positioned within said path of travel for reproducing sound from said images, said sound head including a light sensitive element for receiving the film modulated light, means for positioning the film in said path of travel for cooperation with said sound head, means for continuously feeding the film along said path past said sound head, mechanism for driving said feeding means, and mechanism operatively interconnecting said positioning means and said driving mechanism for assuring the operation of said positioning means prior to the operation of said driving mechanism.

6. In a sound film handling apparatus having a slit-containing member, a source of light, mechanism for continuously feeding a film past said slit, a light sensitive element for receiving the film modulated light, means for driving said feeding mechanism, means for operatively connecting said feeding mechanism and said driving means, means for engaging an edge of the film for laterally moving the film into a predetermined position relative to said mechanism, and a single means for operating said connecting means and said moving means.

7. In a film handling apparatus having a light source and a sound head, said sound head including a light sensitive element for receiving film modulated light, a member for feeding a film bearing sound images past said sound head, a source of power, means for operatively connecting said feeding member and said source of power, presser means for moving the film into operative relation with said feeding member, positioning means movable relatively to said presser means for moving the film into a predetermined position between said presser means and said feeding member, and a single means interconnecting all of said previously mentioned means and effective for operating the same.

8. In a sound film handling apparatus having a light source and a slit-containing member, said sound head including a light sensitive element for receiving film modulated light, means for feeding a film bearing sound images past said slit, mechanism for operating said feeding means, operable means for laterally positioning the film relatively to said feeding means, control mechanism interconnecting said positioning means and said feeding mechanism and necessarily rendering said positioning means effective before said operating mechanism can become effective.

9. Film feeding apparatus having a light source and a sound head and mechanism to feed a film bearing sound symbols thereupon past said sound head including a light sensitive element for receiving the film modulated light, a positioning member adapted to engage the edge of the film for laterally moving it into a predetermined position relative to said feeding mechanism and said sound head, means for operating said positioning member, means for bringing the film into operative relation with said feeding mechanism, a source of power, means for bringing the said feeding mechanism into operative connection with said source of power, means for breaking such operating connection, and control mechanism operatively interconnecting all of the said means and effective to operate each of the same.

10. In a film handling apparatus, a light source, a sound head, said sound head including a light sensitive element for receiving film modulated light, a member for feeding a film bearing sound symbols thereupon past said sound head, a source of power, means for operatively connecting said feeding member and said source of power, means for moving the film in one direction for the purpose of bringing it within a predetermined position relative to said member, means for moving the film in a direction approximately at right angles to such previously mentioned directions for the purpose of moving the film from such position and into an operative relation with said member, each of said moving means being movable relatively to the other and to the film, and a single control means interlocking all of said previously mentioned means and effective for operating the same.

11. In a film handling apparatus having a light source and a sound head, said sound head including a gate having two sections defining a path of travel for a film therebetween and including a light sensitive element for receiving the film modulated light, means for moving a film in a direction angular to such path from a space outside of that intervening between said sections and into such space for a purpose of initially positioning the film in said gate between said sections thereof, means for feeding the film between said sections after such initial positioning therebetween for operating said sound head, and a single actuating mechanism interlocking said feeding means and said moving means.

12. Film handling mechanism including a plurality of means for moving a film bearing both pictorial and sound images for projecting pictures and for reproducing sound from said images respectively, said mechanism including an openable gate adjacent each of said feeding means, said feeding means including an intermittently toothed member for feeding the film intermittently for projecting pictures and a continuous sprocket for feeding the film continuously for reproducing sound, means for moving portions of the film adjacent each gate laterally into position for engagement with each of said feeding means whereby a unitary threading movement of both of said film portions is secured, and means for pressing the film into operative relation with each of said feeding means.

13. In an apparatus for handling a film bearing thereupon images representing sound and pictorial images, an intermittently operating member for intermittently moving the film so that said pictorial images may be projected as motion pictures, a continuously operating member for continuously moving the film so that sound may be reproduced from said sound symbols, and threading means mounted upon said apparatus and effective for engaging an edge of lengthwise sections of the film adjacent said operating members and initially moving the film into the correct position to be engaged by both of said film moving members whereby a unitary threading movement of both of said film portions is secured.

14. In an apparatus for handling a film bearing thereupon images representing sound and pictorial images, an openable picture gate, an intermittently operating member for feeding the film through said picture gate, an openable sound gate, a continuously operating member for feeding the film through said sound gate, and threading means mounted upon said apparatus and effective for initially moving the sections of the film adjacent said gates laterally in respect to said picture gate and said sound gate into the correct positions therein while said gates are open preparatory to said intermittent and continuous feeding operations whereby a unitary threading movement of both of said film sections is secured.

15. In an apparatus for feeding a film bearing thereupon images representing sound and pictorial images, an openable picture gate, an intermittently operating member for feeding the film through said picture gate, an openable sound gate, a continuously operating member for feeding the film through said sound gate, threading means for initially moving the sections of the film adjacent said gate laterally in respect to said picture gate and said sound gate respectively into the correct positions therein while said gates are open preparatory to said intermittent and continuous feeding operations whereby a unitary threading movement of both of said film sections is secured, and control means operatively interconnecting said threading means and both of said gates for concomitantly operating said threading means and closing said gates.

16. In an apparatus for feeding a film bearing thereupon images representing sound and pictorial images, an openable picture gate, an intermittently operating member for feeding the film through said picture gate, an openable sound gate, a continuously operating member for feeding the film through said sound gate, threading means for initially moving a longitudinal section of the film laterally in respect to said picture gate and said sound gate respectively into the correct positions therein while said gates are open preparatory to said intermittent and continuous feeding operations whereby a unitary threading movement of both of said film sections is secured, and control means operatively interconnecting said threading means, both of said feeding members and both of said gates for operating all of the same.

17. In an apparatus for feeding a film bearing thereupon images representing sound and pictorial images, a film guiding member with an aperture corresponding to the pictorial images of the film, a presser member movable between a first position wherein it is disposed relatively distantly from said apertured member and a second position relatively adjacent said apertured member for holding the film thereagainst, a member for intermittently feeding the film past said aperture, a source for passing light through the pictorial portions of the film and said aperture, means for moving the film from a position outside of the space which intervenes between said presser member and said guiding member when said members are disposed in said first position to a position therebetween, a slit-containing member, a photo-electric cell which cooperates with said slit, an exciter lamp for passing light through said sound images and said slit and upon said photo-electric cell, a presser member movable between a first position wherein it is disposed relatively distantly from said slit-containing member and a second position wherein it is disposed relatively adjacent said slit-containing member for holding the film in operative relation thereto, means engaging an edge of the film for moving the film from a position outside of the space which intervenes between said last previously mentioned presser member and said slit-containing member when said members are disposed in said first position to a position therewithin, means for longitudinally feeding the film past said slit-containing member, and control means operatively interconnecting both of said film moving means for actuating both of said means.

18. In an apparatus for feeding a film bearing thereupon images representing sound and pictorial images, a film guiding member with an aperture corresponding to the pictorial images of the film, a presser member movable between a first position wherein it is disposed relatively distantly from said apertured member and a second position relatively adjacent said apertured member for holding the film thereagainst, a member for intermittently feeding the film past said aperture, a source for passing light through the pictorial portions of the film and said aperture, means for moving the film from a position outside of the space which intervenes between said presser member and said guiding member when said members are disposed in said first position to a position therewithin, light-responsive sound reproducing means, a source for passing light through the sound images of the film and upon said light-responsive means, a member for longitudinally moving the film past said light-responsive means and through light from said source thereby reproducing sound from the film, means for starting the operation of said moving member, and control means operatively interconnecting said starting means and said film moving means associated with said presser member for operating both of the same whereby the film is necessarily properly positioned relatively to its pictorial aperture before the sound reproducing operation can commence.

19. In an apparatus for feeding a film bearing thereupon images representing sound and pictorial images, a film guiding member with an aperture corresponding to the pictorial images of the film, a presser member movable between a first position wherein it is disposed relatively distantly from said apertured member and a second position relatively adjacent said apertured member for holding the film thereagainst, a member for intermittently feeding the film past said aperture, a source for passing light through the pictorial portions of the film and through said aperture, means for moving the film from said aperture, means for moving the film from a position outside of the space which intervenes between said presser member and said guiding member when said members are disposed in said first position to a position therewithin, light-responsive sound reproducing means, a source for passing light through the sound images of the film and upon said light-responsive means, a member for longitudinally moving the film past said light-responsive means and through light from said source thereby reproducing sound from the film, means engaging an edge of the film for laterally moving the film into correct lateral relation to said feeding member, means for pressing the film into operative relation to said feeding member after it has been so moved, and control means operatively interconnecting said means for laterally moving the film into relation with said feeding member and said means for moving the film into the space between said presser member and said film guiding member for concomitantly operating both of said film moving means whereby the film is properly positioned relatively to the pictorial aperture concomitantly with its positioning relatively to the feeding member by means of which sound is reproduced therefrom.

20. In an apparatus of the kind described for handling film bearing thereupon images representing pictures and images representing sound, a first means for reproducing pictures from said film, a second means for reproducing sound from film, said first means including an openable gate, said second means including an openable gate approximately aligned with said first named gate in an upright plane therewith, film threading means including movable fingers for shifting a portion of the film laterally edgewise into operative position in said first named gate from a position adjacent thereto, film threading means including movable fingers for shifting a portion of the film laterally edgewise into operative position in said second named gate from a position adjacent thereto, and means for operatively moving all of said fingers at the same time, whereby a unitary shifting movement of said film portions is obtained, the alignment of said gates facilitating said unitary movements.

21. In an apparatus of the kind described for handling film bearing thereupon images representing pictures and images representing sound, a first means for reproducing pictures from said film, a second means for reproducing sound from said film, said first means including an openable gate, said second means including an openable gate approximately aligned with said first named gate in an upright plane therewith, film threading means including movable fingers for shifting a portion of the film laterally edgewise into operative position in said first named gate from a position adjacent thereto, film threading means including movable fingers for shifting a portion of the film laterally edgewise into operative position in said second named gate from a position adjacent thereto, a mounting for all of said fingers on a single uprightly disposed revoluble rod, and control means for revolving said rod to move operatively said fingers and simultaneously shift both portions of said film.

22. In an apparatus of the kind described for handling film bearing thereupon images representing pictures and images representing sound, a first means for reproducing pictures from said film, a second means for reproducing sound from said film, said first means including an openable gate, said second means including an openable gate approximately aligned with said first named gate in an upright plane therewith, film threading means including movable fingers for shifting a portion of the film laterally edgewise into operative position in said first named gate from a position adjacent thereto, film threading means including movable fingers for shifting a portion of the film laterally edgewise into operative position in said second named gate from a position adjacent thereto, a mounting for all of said fingers on a single upright revoluble rod, and a sequential control mechanism effective for first operatively moving all of said fingers at the same time and simultaneously shifting both portions of said film and thereafter closing both of said gates.

23. In an apparatus of the kind described for handling film bearing thereupon images representing sound and images representing pictures, means for operatively moving the film along a work path through said apparatus, a first means for reproducing pictures from said film, a second means for reproducing sound from said film, said first means including an openable gate, said second means including an openable gate at a point distant from said first-named gate, and film threading means effective for shifting a longitudinal portion of the film in one unitary movement into operative positions in both of said gates from initial threading positions adjacent to said operative positions.

24. In an apparatus of the kind described for handling film bearing thereupon images representing sound and images representing pictures, means for operatively moving the film along a work path through said apparatus, a first means for reproducing pictures from film, a second means for reproducing sound from said film, said first means including an openable gate, said second means including an openable gate at a point distant from first-named gate, and film threading means effective for shifting a longitudinal portion of the film in one unitary movement into operative positions in both of said gates from initial threading positions adjacent to said operative positions, said threading means including separate film shifting fingers associated with each gate, mechanism operatively interconnecting said fingers, and a movable control member for moving said interconnecting mechanism to operate said film shifting fingers.

BARTON A. PROCTOR.